United States Patent
Bartoschek et al.

[11] Patent Number: 5,188,339
[45] Date of Patent: Feb. 23, 1993

[54] SHEET METAL HOUSING FOR VALVES

[75] Inventors: Manfred Bartoschek, Frankenthal, Fed. Rep. of Germany; Primo Lovisetto, Vicenza, Italy

[73] Assignee: KSB Aktiengesellschaft, Frankenthal/Pfalz, Fed. Rep. of Germany

[21] Appl. No.: 730,864
[22] PCT Filed: Jan. 9, 1990
[86] PCT No.: PCT/EP90/00037
   § 371 Date: Jul. 22, 1991
   § 102(e) Date: Jul. 22, 1991
[87] PCT Pub. No.: WO90/08280
   PCT Pub. Date: Jul. 26, 1990

[30] Foreign Application Priority Data

Jan. 21, 1989 [DE] Fed. Rep. of Germany ....... 3901698

[51] Int. Cl.$^5$ .............................................. F16K 51/00
[52] U.S. Cl. ..................................... 251/367; 251/366
[58] Field of Search ................................. 251/366, 367

[56] References Cited

U.S. PATENT DOCUMENTS 1,148,119  7/1915  Patterson ............................ 251/367
2,869,221  1/1959  Siepmann ........................... 251/367

FOREIGN PATENT DOCUMENTS 182974   4/1907   Fed. Rep. of Germany ...... 251/367
638462   11/1936  Fed. Rep. of Germany .
1550613  10/1969  Fed. Rep. of Germany .
2347825  6/1975   Fed. Rep. of Germany .
3113664  10/1982  Fed. Rep. of Germany .
522126   6/1940   United Kingdom .

OTHER PUBLICATIONS

Sulzer Technical Bulletin, Feb. 1973.

Primary Examiner—A. Michael Chambers
Attorney, Agent, or Firm—Peter K. Kontler

[57]  ABSTRACT

A valve has a valve seat, and a housing which accommodates the seat. The housing is formed from two sheet metal shells each of which has two sections. A first section of each shell defines a conical frustum, and the larger-diameter end of each frustum is bevelled. The second section of each shell is cylindrical and is seamlessly connected to the bevelled end of the respective first section so that the first and second sections of each shell are inclined relative to one another. The second sections have respective plane end faces which confront one another and are located in planes intersecting both the transverse and longitudinal axes of the valve. A circumferentially complete weld seam bonds the end faces to each other.

18 Claims, 2 Drawing Sheets

SHEET METAL HOUSING FOR VALVES

BACKGROUND OF THE INVENTION

The invention relates to a valve housing.

A housing for gate valves is known from the German Auslegeschrift 15 50 613 and is made of sheet metal shells. The housing shells in this known structure are shaped from sheet metal so that they are hinged to one another and merge seamlessly at the bottom of the housing. After shaping, the housing shells are bent up about the longitudinal axis of the housing chamber and are welded to each other at the abutting edges. Such a manufacturing method allows the disadvantageous weld seam in the bottom of the housing to be eliminated; however, this method is very expensive because of the additional bending procedure.

It is also known to so design a valve housing assembled from hemispherical shells that the weld seam connecting the two shell portions to one another is located in a plane which intersects the transverse and longitudinal axes of the valve (Sulzer technical bulletin, February 1973). In this known housing, which is associated with a low-pressure regulating valve, the weld seam runs around the entire housing without any breaks and without crossing another weld seam. In addition to connecting the housing shells, such weld seam also secures a part carrying the valve seat. This housing design, which is advantageous from as regards welding, has been used in a similar form for a ball cock housing (German Offenlegungsschrift 23 47 825).

The hemispherical shells employed in the known valve housings constitute only the central portion of the housing which must be completed on the sides with tubular stubs. Two additional weld seams must be provided for these tubular stubs which, for connection to a pipe, are equipped with a flange or are designed to be welded. Additional weld seams are formed when a housing mount or an intermediate floor is necessary to complete the valve.

OBJECT OF THE INVENTION

It is an object of the invention to provide a sheet metal valve housing which, while suitable for different types of shutoff valves and allowing favorable flow, can be produced with a small number of weld seams.

SUMMARY OF THE INVENTION

According to the invention, this object is achieved by a valve housing comprising a first shell having two sections which are inclined and seamlessly connected to one another. One of the sections has a first plane end face and the housing further comprises a second shell having two sections which are inclined and seamlessly connected to one another. One section of the second shell has a second plane end face which confronts the first plane end face, and the housing further comprises a seam of fused and hardened material which bonds the plane end faces to one another.

DESCRIPTION OF PREFERRED EMBODIMENTS

Figure 1:
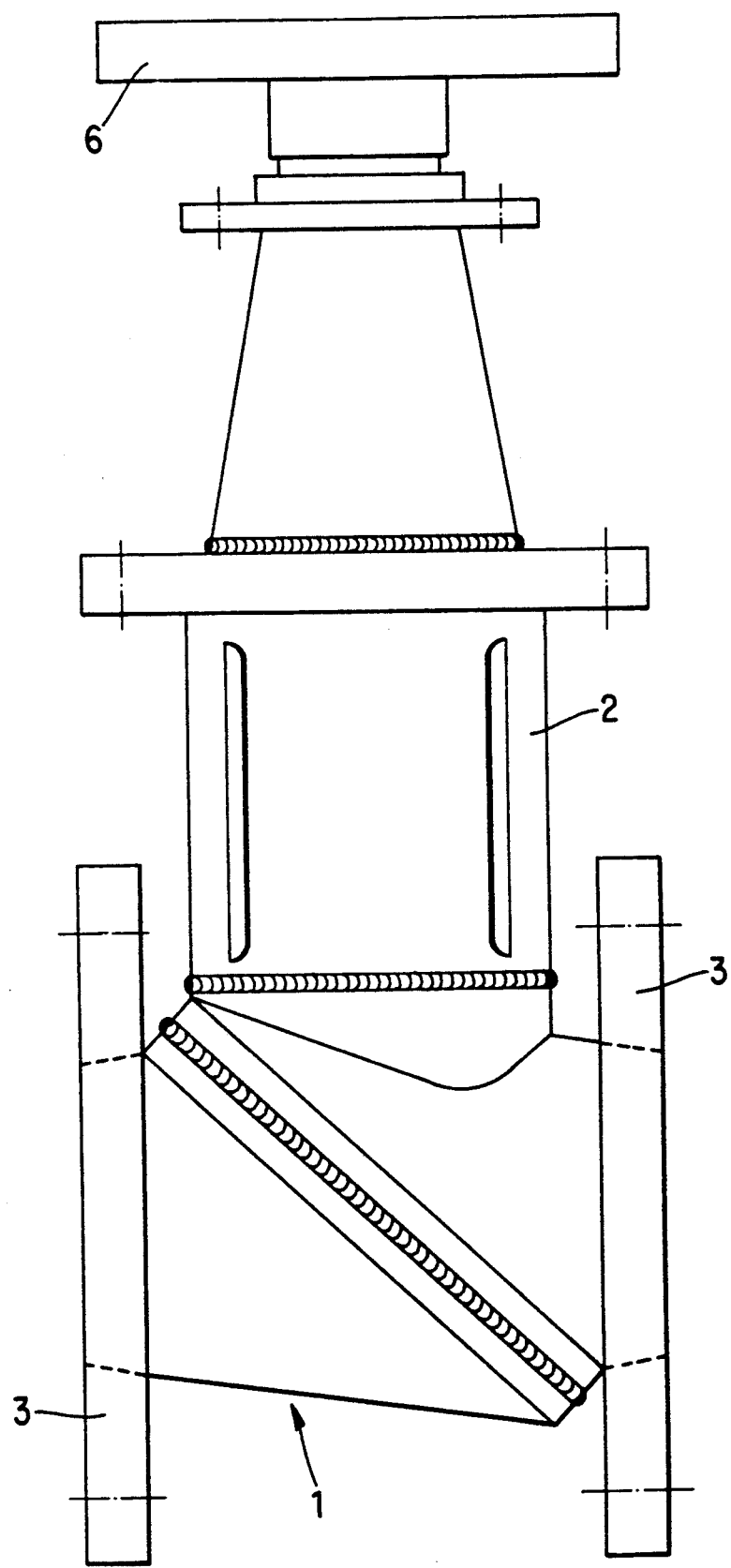
FIG. 1 is a side view of a valve housing.
Figure 2:
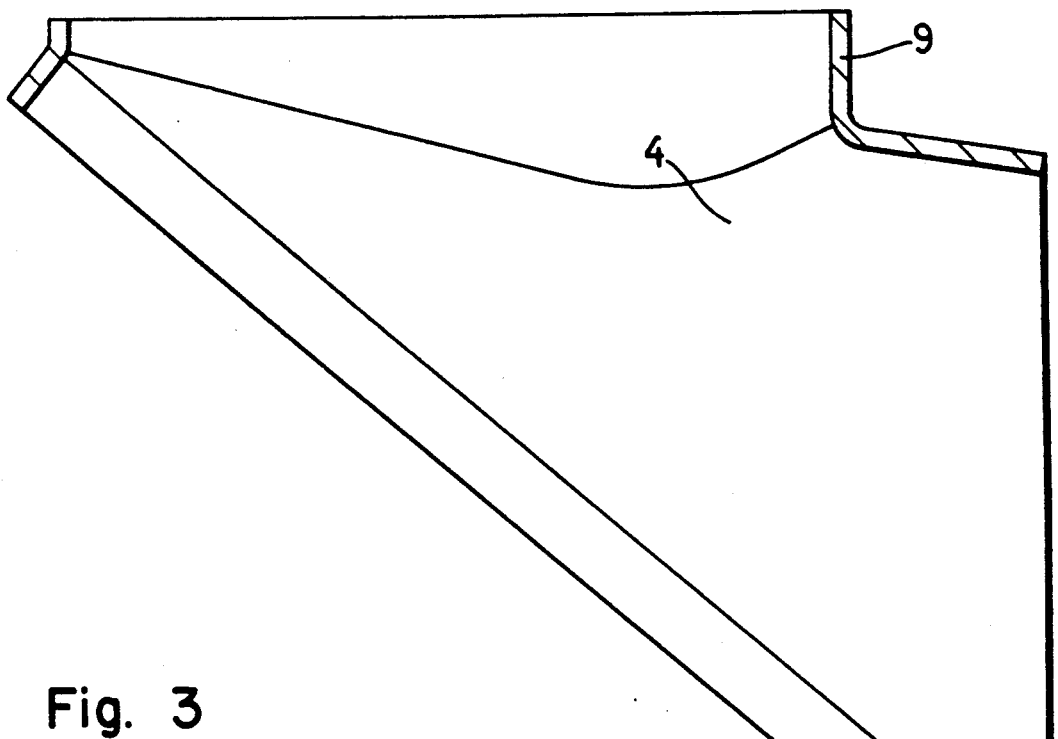
FIG. 2 is a sectional view of the upper half of the main part of the valve housing illustrated in FIG. 1.
Figure 3:
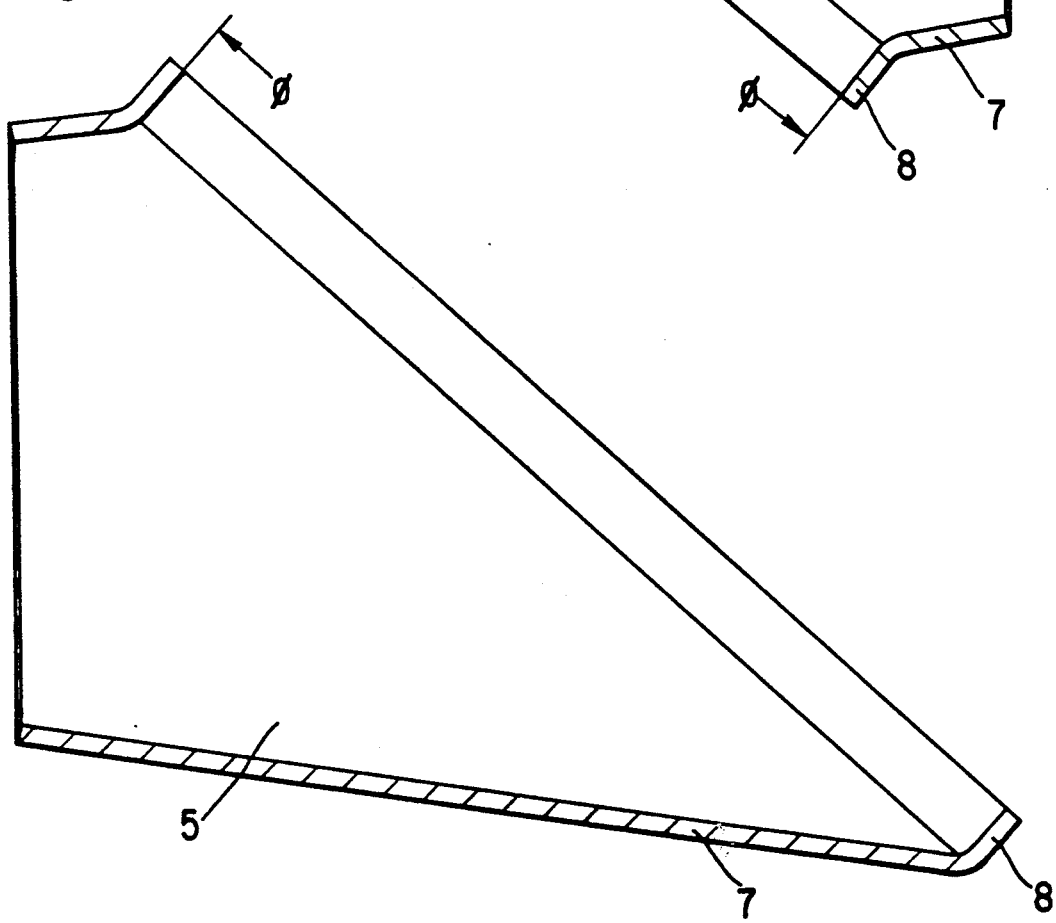
FIG. 3 is a sectional view of the lower half of the main part of the housing.

The valve housing consisting essentially of a main part 1 and a housing mount 2 has flanges 3 welded thereto. The main part 1 is constituted by two shell portions 4,5. The shell portions 4,5—illustrated in FIGS. 2 and 3—are connected to one another by a circumferentially complete weld seam. A handwheel 6 forms the upper end of the valve.

The upper shell portion 4 and the lower shell portion 5 essentially constitute the peripheries of two conical frustums 7 which are bevelled at the end of larger diameter and, in the region of the bevel, seamlessly merge into a cylindrical zone 8 having a plane end. The conical frustum constitutes the simplest form of shell portion. However, modifications derived from the conical frustum are also feasible.

The upper shell portion 4 is provided with an opening 9 which is defined by an outwardly directed flange and serves for connection of the housing mount 2. Both shell portions 4,5 are provided with a cylindrical calibrater in the zone 8. The calibrater could also be conical or spherical.

The housing of the invention is suitable for different types of valves. By way of example, it can be used for a valve having a conical, cylindrical or flat valving element, for a gate valve or for a nonreturn valve.

We claim:

1. A valve having a housing, said housing comprising a first shell having two sections which are inclined, and seamlessly connected, to one another, one of said first shell sections having a first plane end face; and a second shell having two sections which are inclined, and seamlessly connected, to one another, one of said second shell sections having a second plane end face which confronts said first plane end face; and a seam of fused and hardened material bonding said plane end faces to one another.

2. The valve of claim 1, wherein the other first shell section and the other second shell section each define a conical frustum having a bevelled end, said bevelled ends being adjacent to said one first shell section and said one second shell section, respectively.

3. The valve of claim 2, wherein said one first shell section and said one second shell section are substantially rotationally symmetric.

4. The valve of claim 3, wherein said one first shell section and said one second shell section are substantially cylindrical.

5. The valve of claim 2, wherein each of said other shell sections has a second end of smaller diameter than the respective bevelled end.

6. The valve of claim 1, wherein each of said shells comprises sheet metal.

7. The valve of claim 1, wherein said valve has a transverse axis and a longitudinal axes and said seam is located in a plane which intersects both of said axes.

8. The valve of claim 1, wherein said seam is a weld seam.

9. The valve of claim 1, wherein said seam is substantially circumferentially complete.

10. The valve of claim 1, further comprising a valve seat internally of said shells.

11. The valve of claim 1, wherein one of said shells is provided with an opening, and an outwardly extending flange circumscribing said opening; and further comprising a support mounted over said opening.

12. The valve of claim 11, further comprising a second seam of fused and hardened material connecting said support to said flange.

13. The valve of claim 12, wherein said second seam is substantially circumferentially complete.

14. The valve of claim 12, wherein said second seam is a weld seam.

15. The valve of claim 11, wherein said opening is substantially cylindrical.

16. The valve of claim 11, wherein said flange is seamlessly connected to said one shell.

17. The valve of claim 1, further comprising calibrating means on said one first shell section and said one second shell section.

18. The valve of claim 17, wherein said calibrating means extend substantially normal to the respective end faces.

* * * * *